US007018745B2

(12) United States Patent
Stepanov et al.

(10) Patent No.: US 7,018,745 B2
(45) Date of Patent: Mar. 28, 2006

(54) CONTROLLED PHASE DELAY BETWEEN BEAMS FOR WRITING BRAGG GRATINGS

(75) Inventors: Dmitrii Stepanov, Croydon Park (AU); Mark Sceats, Pyrmont (AU)

(73) Assignee: The University of Sydney, Sydney (AU)

( * ) Notice: Subject to any disclaimer, the term of this patent is extended or adjusted under 35 U.S.C. 154(b) by 52 days.

(21) Appl. No.: 10/338,884

(22) Filed: Jan. 9, 2003

(65) Prior Publication Data

US 2003/0124438 A1 Jul. 3, 2003

Related U.S. Application Data

(63) Continuation of application No. 09/674,302, filed as application No. PCT/AU99/00417 on May 28, 1999, now abandoned.

(30) Foreign Application Priority Data

May 29, 1998 (AU) ..................................... PP3816

(51) Int. Cl.
*G03H 1/04* (2006.01)
*G03C 5/56* (2006.01)

(52) U.S. Cl. ............................. 430/1; 430/2; 430/290; 430/945; 385/37

(58) Field of Classification Search .................... 430/1, 430/2, 290, 945; 385/37
See application file for complete search history.

(56) References Cited

U.S. PATENT DOCUMENTS

| | | | | |
|---|---|---|---|---|
| 4,432,239 A * | 2/1984 | Bykov | | 73/800 |
| 4,954,789 A | 9/1990 | Sampsell | | 350/487 |
| 5,066,133 A | 11/1991 | Brienza | | 359/570 |
| 5,128,693 A | 7/1992 | Tatemichi et al. | | 359/22 |
| 5,182,455 A | 1/1993 | Maraki | | 356/401 |
| 5,388,173 A | 2/1995 | Glenn | | 385/37 |
| 5,640,239 A | 6/1997 | Takamiya et al. | | 356/345 |
| 5,754,282 A | 5/1998 | Kato et al. | | 359/278 |

FOREIGN PATENT DOCUMENTS

| | | |
|---|---|---|
| FR | 2 768 819 | 3/1999 |
| JP | 54-100752 | 8/1979 |
| WO | 96/36895 | 11/1996 |
| WO | 97/21120 | 6/1997 |
| WO | 97/26570 | 7/1997 |

* cited by examiner

*Primary Examiner*—Martin Angebranndt
(74) *Attorney, Agent, or Firm*—Foley & Lardner LLP

(57) ABSTRACT

A method of writing an extended grating structure in a photosensitive waveguide comprising the steps of utilizing at least two overlapping beams of light to form an interference pattern, moving the waveguide through said overlapping beams, simultaneously controlling a relative phase delay between the beams utilising a phase modulator, thereby controlling the positions of maxima within said interference pattern to move at approximately the same velocity as the photosensitive waveguide, wherein the phase modulator does not comprise a mechanical means for effecting the phase modulation, and modifying the relative phase delay between the beams during the writing of the grating structure, whereby a deliberate detuning of the velocity of the positions of maxima within said interference pattern and the velocity of the photosensitive waveguide is utilized to vary a period of the written grating structure in the photosensitive waveguide.

15 Claims, 3 Drawing Sheets

CONTROLLED PHASE DELAY BETWEEN BEAMS FOR WRITING BRAGG GRATINGS

This application is a continuation of U.S. application Ser. No. 09/674,302, filed on Jan. 16, 2001, now abandoned.

FIELD OF THE INVENTION

The present invention relates to the field of constructing Bragg gratings or the like in UV or like photosensitive waveguides utilizing a UV or like interference pattern.

BACKGROUND OF THE INVENTION

The present invention is directed to writing gratings or other structures in a photosensitve optical waveguide. The creation of a grating utilizing the interference pattern from two interfering coherent UV beams is well known. This technique for construction of Bragg gratings is fully described in U.S. Pat. No. 4,725,110 issued to W H Glenn et al and U.S. Pat. No. 4,807,950 issued to W H Glenn et al.

Bragg grating structures have become increasingly useful and the demand for longer and longer grating structures having higher and higher quality properties has lead to the general need to create improved grating structures.

SUMMARY OF THE INVENTION

In accordance with a first aspect of the present invention there is provided a method of writing an extended grating structure in a photosensitive waveguide comprising the steps of utilising at least two overlapping beams of light to form an interference pattern, moving the waveguide through said overlapping beams, simultaneously controlling a relative phase delay between the beams utilising a phase modulator, thereby controlling the positions of maxima within said interference pattern to move at approximately the same velocity as the photosensitive waveguide, wherein the phase modulator does not comprise a mechanical means for effecting the phase modulation, and modifying the relative phase delay between the beams during the writing of the grating structure, whereby a deliberate detuning of the velocity of the positions of maxima within said interference pattern and the velocity of the photosensitive waveguide is utilised to vary a period of the written grating structure in the photosensitive waveguide.

Preferably, the at least two overlapping beams are formed by the splitting of a single coherent beam of light.

In one embodiment, the steps of controlling and modifying of the relative phase delay is performed before the splitting of the single coherent beam.

In one embodiment, the steps of controlling and modifying of the relative phase delay may be performed after the splitting of the single coherent beam.

In one embodiment, the steps of controlling and modifying of the relative phase delay is performed prior to the splitting of the single coherent beam.

Said modulator may comprise one or more of a group comprising an electro-optic phase modulator, a magneto-optic phase modulator, a frequency shifter, an acousto-optic frequency shifter, a controllable optical retarder, and an optical delay line.

In one embodiment, the method further comprises, after the splitting of the single coherent beam, the step of reflecting said beams at a series of reflection elements for effecting the overlapping of the beams to form the interference pattern.

The method may further comprise utilising a feedback loop in controlling and modifying of the phase delay to improve the noise properties of the grating structure. The feedback loop comprises an opto-electronic feedback loop.

The grating structure may comprise a chirped grating and/or an apodized grating.

The grating structure may have one or more of a group comprising a predetermined strength profile, a predetermined period profile, and a predetermined phase profile.

In one embodiment, the two beams have substantially orthogonal polarization states and wherein the modulator modulates the relative phase delay between the polarization states and wherein the method further comprises the step of aligning the polarization states of the beams subsequent to modulating the relative phase delay for forming the interference pattern.

The two beams having the substantially orthogonal polarization states may initially from a single beam of light, and a polarization splitter element is utilised to separate the two beams from each other. The modulator may modulate the relative phase delay between the polarisation states in the single beam.

In accordance with a second aspect of the present invention, there is provided a device for writing an extended grating structure in a photosensitive waveguide comprising an interferometer arranged to form an interference pattern utilising at least two overlapping beams of light; a phase modulator for controlling a relative phase delay between the beams whereby, in use, the positions of maxima within said interference pattern are controlled to move at approximately the same velocity as the photosensitive waveguide moving through said overlapping beams, wherein the phase modulator does not comprise a mechanical means for effecting the phase modulation, and wherein the phase modulator is arranged, in use, to modify the relative phase delay between the beams during the writing of the grating structure, whereby a deliberate detuning of the velocity of the positions of maxima within said interference pattern and the velocity of the photosensitive waveguide is utilised to vary a period of the written grating structure in the photosensitive waveguide.

Preferably, the device comprises a beam splitter element for splitting of a single coherent beam of light into said at least two overlapping beams.

In one embodiment, the device is arranged, in use, such that the controlling and modifying of the relative phase delay is performed before the splitting of the single coherent beam.

In one embodiment, the device is arranged, in use, such that the controlling and modifying of the relative phase delay is performed after the splitting of the single coherent beam.

In one embodiment, the device is arranged, in use, such that the controlling and modifying of the relative phase delay is performed prior to the splitting of the single coherent beam.

Said modulator may comprise one or more of a group comprising an electro-optic phase modulator, a magneto-optic phase modulator, a frequency shifter, an acousto-optic frequency shifter, a controllable optical retarder, and an optical delay line.

In one embodiment, the device further comprises a series of optical reflection elements for effecting the overlapping of the beams to form the interference pattern.

The device may further comprise a feedback unit for facilitating the controlling and modifying of the phase delay to improve the noise properties of the grating structure. The feedback unit may comprise an opto-electronic feedback loop.

In one embodiment, the two beams have substantially orthogonal polarization states and the modulator is arranged, in use, to modulate the relative phase delay between the polarization states and wherein the device further comprises a polarisation manipulation element for aligning the polarization states of the beams subsequent to modulating the relative phase delay for forming the interference pattern.

The two beams having the substantially orthogonal polarization states may initially from a single beam of light, and the device compresses a polarization splitter element for separating the two beams from each other.

The modulator may be arranged, in use, to modulate the relative phase delay between the polarisation states in the single beam.

BRIEF DESCRIPTION OF THE DRAWINGS

Notwithstanding any other forms which may fall within the scope of the present invention, preferred forms of the invention will now be described, by way of example only, with reference to the accompanying drawings in which.

DETAILED DESCRIPTION OF THE EMBODIMENTS

Figure 1:
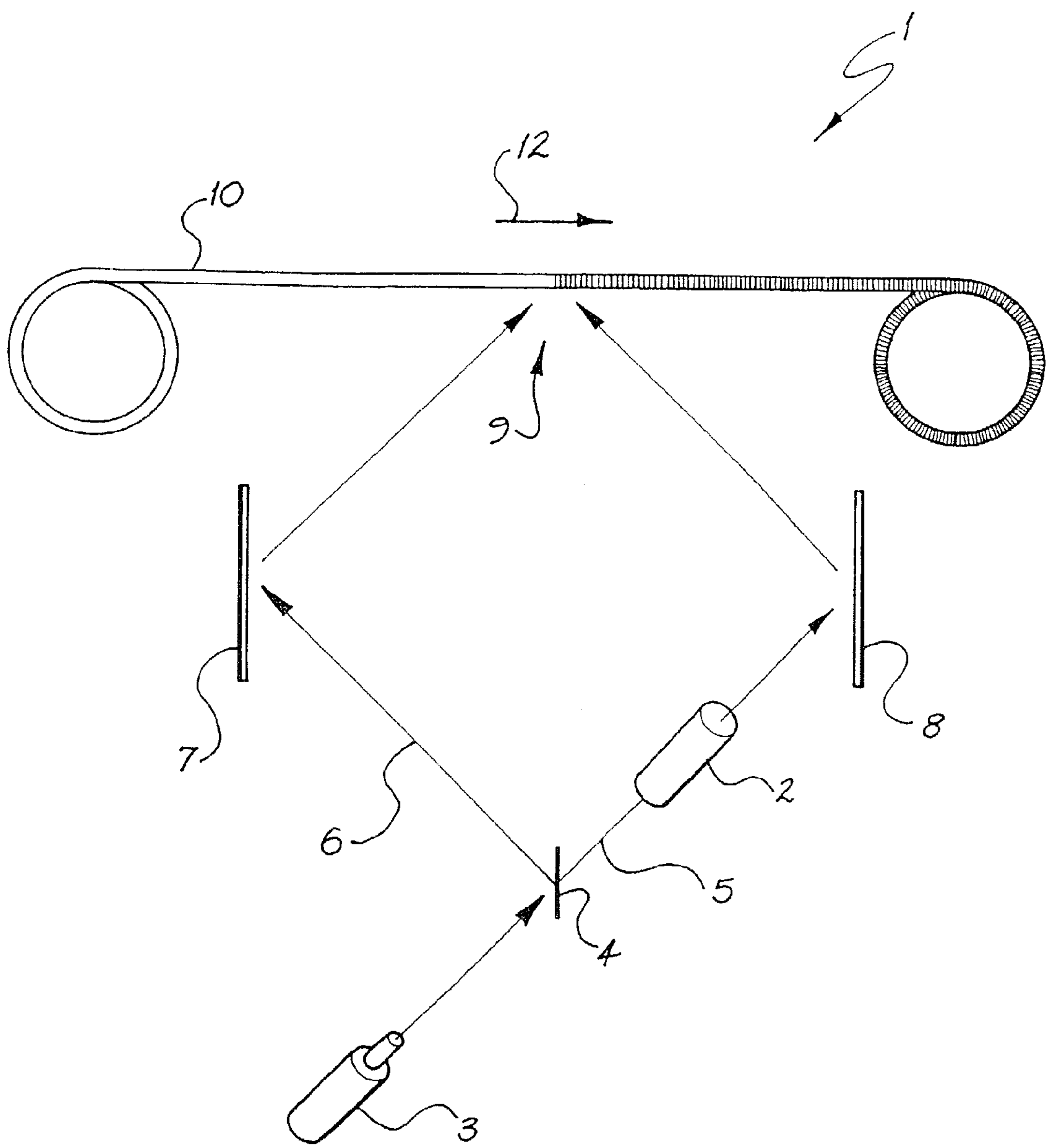
FIG. 1 illustrates schematically a first embodiment of the present invention.
Figure 2:
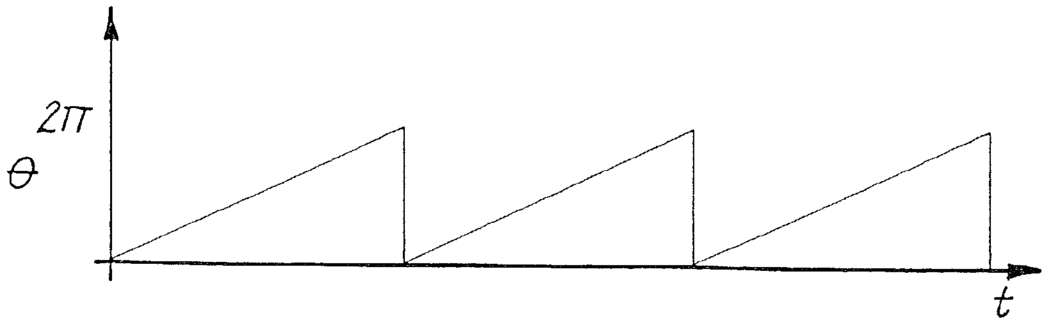
FIG. 2 illustrates one form of driving of the electro-optic modulator in accordance with the principles of the present invention.

Turning initially to FIG. 1, there is illustrated the arrangement 1 of a preferred embodiment which is similar to the aforementioned arrangement of Glenn et al with the additional inclusion of an optical phase modulating element 2. The basic operation of the arrangement of FIG. 1 is that a UV source 3 undergoes beam splitting by beamsplitter 4 so as to form two coherent beams 5, 6. A phase mask placed appropriately into a setup can be used to split the beam. Each beam is reflected by a suitably positioned mirror e.g. 7, 8 so that the beams interfere in the region 9. In this region, there is placed a photosensitive optical waveguide 10 on which an extended grating structure is to be written. The essence of the preferred embodiment is to utilize the phase modulator 2 so as to modulate the relative phase difference between the two beams 5, 6 at the point of interference 9 such that the interference pattern remains static in the reference frame of the optical waveguide 10 as the waveguide is moved generally in the direction 12. The phase modulator 2 can be an electro-optic modulator of a known type including an ADP, KD*P, BBO crystal type transparent at the UV source wavelength. Suitable electro-optic crystals are available from many optical components manufacturers including Leysop Limited under the model numbers EM200A and EM200K. The modulator operates so as to provide for a controlled phase delay of the beam 5 relative to the beam 6. In a first example, the control is achieved by setting the level of an input signal given the fibre 10 is moving at a constant velocity. The input signal in this case can comprise a saw tooth wave form as illustrated in FIG. 2, the maximum saw tooth magnitude being set to be equivalent to a 2π phase delay. The slope of the saw tooth wave form is set so as to closely match the velocity of the changing maxima of the interference pattern to that of the fibre 10.

Hence, prior known mechanical methods of movement of the portion of the apparatus is dispensed with and long or stitched interference patterns can be obtained through the utilization of the phase modulating device 2 to introduce the required optical phase difference between the interfering UV beams 5 and 6. AS the phase is invariant with respect to a 2π change, there is no need to introduce large phase differences thus limiting the required amplitude of the phase change to 2π and allowing it to operate near the balance point of the interferometer. The electro-optically induced phase change will make the interference pattern move along the fibre as the fibre itself moves and the direction and velocity of the move can be set in accordance with requirements. The saw tooth wave form achieving the effect of "running lights".

Electro-optic modulators such as those aforementioned can operate with very low response time and extremely high cut off frequencies. Hence, the saw tooth edge fall can be practically invisible and a near perfect stitch can be achieved. At 6 mm per minute scanning speed, the modulation frequency can be about 200 Hz.

Further, by applying a differential velocity between the fibre and the pattern or through appropriate control of the phase delay, a wavelength shift with respect to the static case can be obtained. An acceleration or appropriate control of the phase delay can be used to produce a chirp and so on. Apodisation can also be provided by proper additional modulation of the electro-optic modulator.

The embodiment described has an advantage of having all optical elements static except for the moving fibre. Therefore, it allow for focussing of the interfering beams tightly onto the fibre and achieving spatial resolution reaching fundamental limits (of the order of the UV writing wavelength, the practical limit being the fibre core diameter). The static interferometer arrangement itself leads to reduced phase and amplitude noise of the interference pattern. Additionally, the ability to control the phase and amplitude of the pattern using a feedback loop provides a means to improve the noise properties of the interferometer substantially.

A number of further refinements are possible. For example, in order to accurately match the velocity of the fibre 10 and the electro-optic modulator frequency, a simple scanning Fabry-Perot interferometeric sensor can be used to measure the relative positions of the fibre and the interference pattern 9. A high finesse (F) resonator can be used to achieve the accuracy of distance measurements much better than the wavelength of the narrow line width source which would be employed in the sensor.

By scanning the Fabry-Perot at a constant rate or sweeping the laser frequency the position can be precisely (½F) determined. To increase the resolution further a conversion of the interferometer into a laser at threshold may be needed. In this case the finesse F of the cavity is close to infinity and the resolution is enhanced. Other types of interferometric sensors such as a Michelson interferometer can be used to accurately determine the fibre position with respect to the interference pattern.

Figure 3:
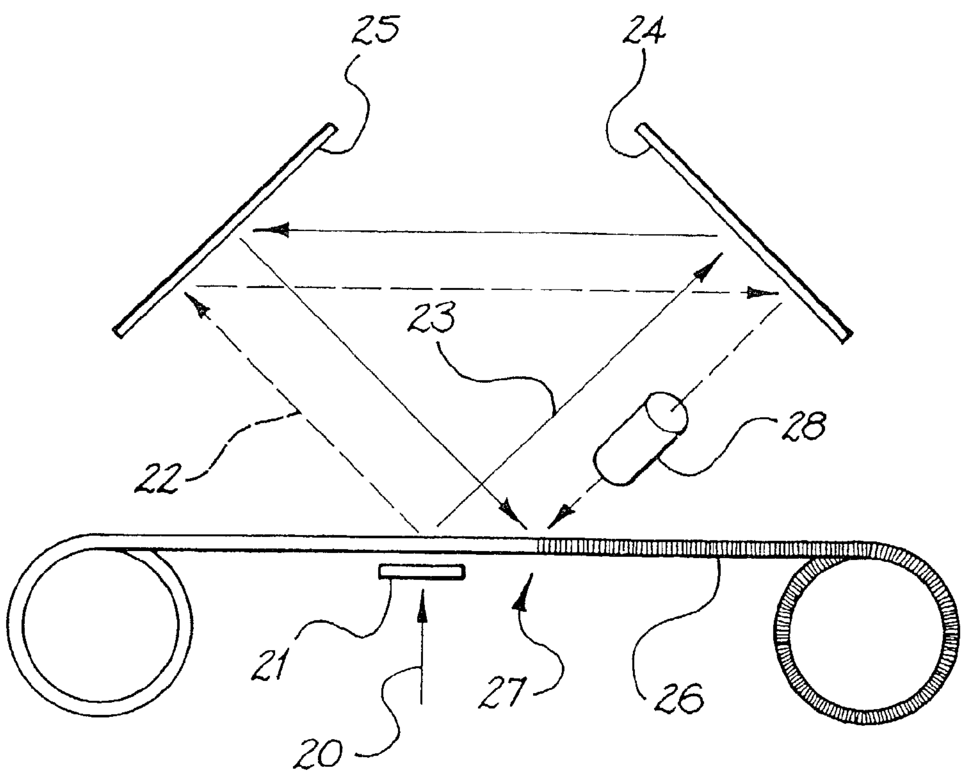
FIG. 3 illustrates an alternative embodiment of the present invention.

Of course, other arrangements utilizing this principle are possible. For example, the teachings of PCT patent application no. PCT/AU96/00782 by Ouellette et al discloses an improved low noise sensitivity interferometric arrangement which operates on a "Sagnac loop" type arrangement. Turning now to FIG. 3 there is illustrated a modified form of the Ouellette arrangement to incorporate the principles of the present invention. In this modified form, an initial input UV beam 20 is diffracted by phase mask 21 so as to produce two output beams 22, 23. The beam 23 is reflected by mirrors 24, 25 so as to fall upon the fibre 26 in the area 27. Similarly, beam 22 is reflected by mirror 25 and mirror 24 before passing through an electro-optic modulator 28 which modifies the phase of the beam relative to the beam 23. The two beams interfere in the area 27. The phase of the interference patterns can be controlled by the modulator 28 in the same manner as the aforementioned. In this manner, the advantages of the previous Ouellette arrangement can be utilized in a stable mechanical arrangement in that it is not necessary to sweep the beam across the phase mask 21 or perform any other movements other than the electrical modulation of the modulator element 28 whilst forming an extended grating structure. Moreover, the interferometer can be adjusted to operate near its balance point and a low coherence length UV source can be used in the arrangement.

Further, a phase modulator based on a magneto-optic effect could be used instead of an electro-optic modulator. In the Sagnac interferometer arrangement, it can be placed such that both of the interfering beams pass the Faraday cell in opposite directions such that a non-reciprocal controlled relative phase delay is introduced between the counter propagating beams.

Figure 4:
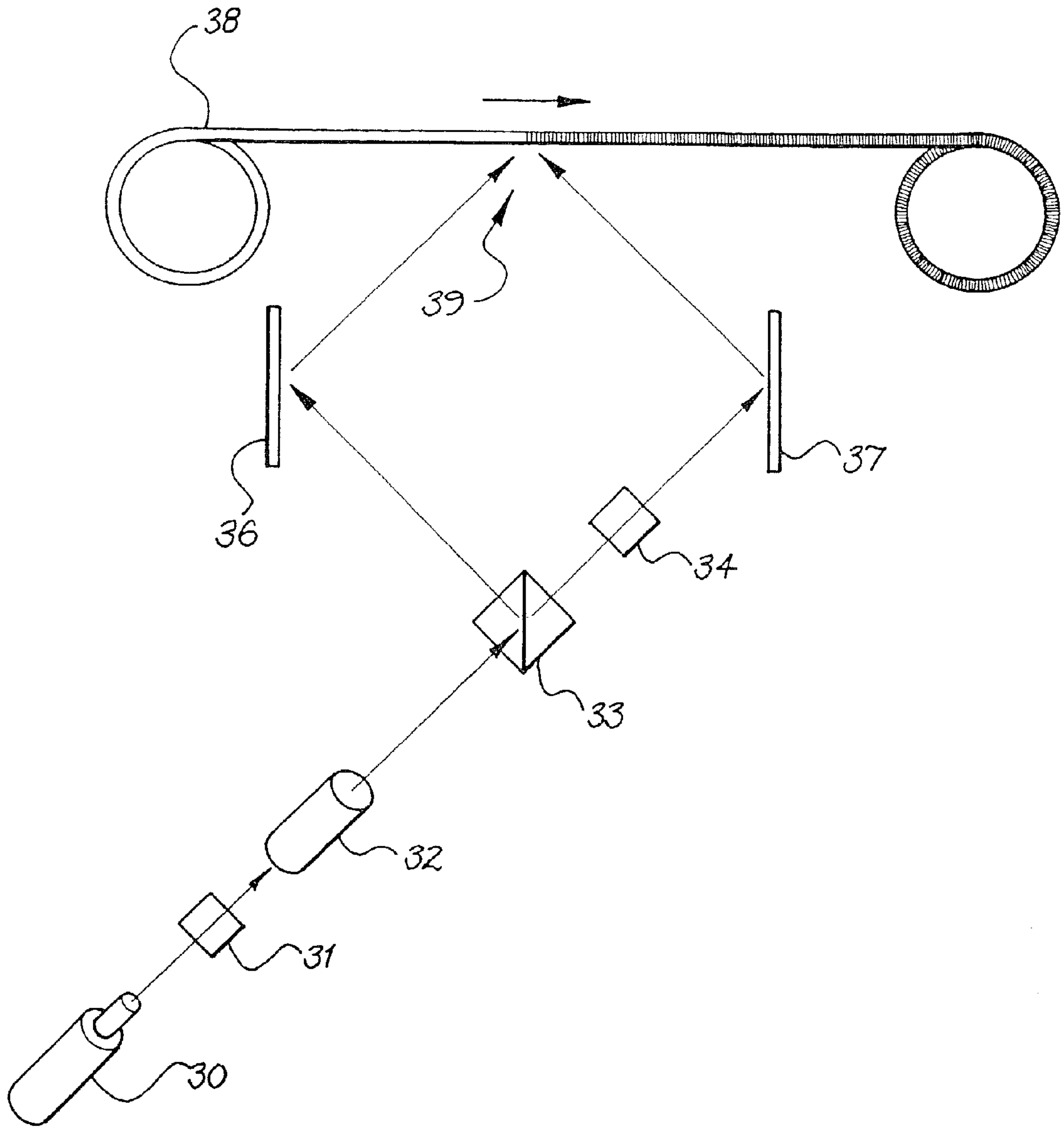
FIG. 4 illustrates a further alternative embodiment of the present invention.

Turning now to FIG. 4 there is illustrated an alternative arrangement to incorporate the principles of the present invention. In this arrangement, the output from a UV laser 30 is initially linearly polarized 31 before passing through an electro-optic modulator 32 which modifies the polarization state of the beam. The polarization plane of the UV beam with respect to the birefringent axes of the electro-optic modulator 32 is such that two orthogonal polarization eigenstates with equal intensities propagate in the modulator, with one of the eigenstates being phase modulated while the other one being not. The arrangement uses polarization beam splitter 33 to separate the polarization states and half-wave plate 34 is used to 90 degree rotate the polarization of one of the resulting beams to allow for the interference taking place between the beams. The beams are further reflected by mirrors 36 and 37 so as to fall upon the fibre 38 in the area 39 to produce an interference pattern in conjunction with movement of the fibre 38. The phase of the interference pattern can be controlled by the modulator 32 in the same manner as the aforementioned to produce an extended grating structure.

In a further alternative embodiment, a travelling wave acousto-optic (AO) modulator transparent at the wavelength of the UV source 3 can be used as a modulating element 2 to frequency shift the diffracted light. The interference between the two beams at different frequencies in region 9 will result in a interference pattern travelling at a velocity $v=-\Delta v \cdot \Lambda/2$. For example, for $\Delta v=200$ Hz frequency shift and $\Lambda=1$ μm interference pattern period the velocity of the pattern is v=6 mm/min and the optical waveguide 10 should be translated at this speed in the same direction. No special modulation waveforms need to be applied in this case, with the control parameter being the frequency shift. As most commercial acousto-optic modulators operate in a MHz range, a frequency shift of the second interfering beam may be required to achieve the differential frequency shift in the Hz–kHz range. There may be also need for a minor adjustment compared to the electro-optic modulator arrangement of FIG. 2 as the Bragg angle will vary with the frequency of the applied to the AO modulator signal resulting in a displacement of the diffracted beam. However the effect of this displacement can be reduced by making the setup compact. There could also be a further adjustment since AO modulators may exhibit resonances.

In a modified embodiment, an optical phase mask, optical wedge or an optical waveplate can be utilized. The optical phase mask can also have a function of the beamsplitter. The embodiment utilizing the phase mask works for all known phase-mask based interferometer arrangements, such as phase mask direct writing technique, or for a Sagnac interferometer writing technique (such as that due to Ouellette disclosed on PCT application number PCT/AU96/00782) or when utilizing the aforementioned system due to Glenn et al.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method of writing an extended grating structure in a photosensitive waveguide comprising:

utilising at least two overlapping beams of light to form an interference pattern, moving the waveguide through an overlap region defined by said overlapping beams, simultaneously varying the phase of at least one of the beams relative to at least one of the other beams utilising a phase modulator, thereby variably controlling the velocity of the maxima within said interference pattern so that such velocity is different from the velocity of the photosensitive waveguide within the overlap region for the duration of the writing, excluding any periods of velocity change when the velocity of said maxima momentarily equals the velocity of the waveguide, wherein:

the phase modulator comprises a non-mechanical means for effecting the phase modulation, and variation of the velocity of the maxima within the overlap region relative to the photosensitive waveguide is utilised to vary at least one of the phase, amplitude and period properties of at least a portion of the extended grating structure in the photosensitive waveguide.

2. A method as claimed in claim 1, wherein the at least two overlapping beams are formed by the splitting of a single coherent beam of light.

3. A method as claimed in claim 2, wherein the steps of varying the relative phase delay is performed before the splitting of the single coherent beam.

4. A method as claimed in claim 2, wherein the steps of varying the relative phase delay is performed after the splitting of the single coherent beam.

5. A method as claimed in claim 2, wherein the steps of varying the relative phase delay is performed in the process of the splitting of the single coherent beam.

6. A method as claimed in claim 2, wherein the method further comprises, after the splitting of the single coherent beam, the step of reflecting said beams at a series of reflection elements for effecting the overlapping of the beams to form the interference pattern.

7. A method as claimed in claim 1, wherein said modulator comprises one or more of a group comprising an electro-optic phase modulator, a magneto-optic phase modulator, a frequency shifter, an acousto-optic frequency shifter, a controllable optical retarder, and an optical delay line.

8. A method as claimed in claim 1, further comprising utilising a feedback loop in varying the relative phase delay to improve the noise properties of the grating structure.

9. A method as claimed in claim 8, wherein the feedback loop comprises an opto-electronic feedback loop.

10. A method as claimed in claim 1, wherein the grating structure comprises a chirped grating and/or an apodized grating.

11. A method as claimed in claim 1, wherein the grating structure has one or more of a group comprising a predetermined amplitude profile, a predetermined period profile, and a predetermined phase profile.

12. A method as claimed in claim 1, wherein the two beams have substantially orthogonal polarization states and wherein the modulator modulates the relative phase delay between the polarization states and wherein the method further comprises the step of aligning the polarization states of the beams subsequent to varying the relative phase delay for forming the interference pattern.

13. A method as claimed in claim 12, wherein the two beams having the substantially orthogonal polarization states initially from a single beam of light, and a polarization splitter element is utilised to separate the two beams from each other.

14. A method as claimed in claim 13, wherein the modulator varies the relative phase delay between the polarisation states in the single beam.

15. A method as claimed in claim 1, wherein a complete grating structure is written in a single continuous exposure step.

* * * * *